United States Patent [19]

Okamoto

[11] Patent Number: 4,958,298

[45] Date of Patent: Sep. 18, 1990

[54] PRINTING APPARATUS HAVING MEANS FOR CLEARING UNWANTED PRINT DATA STORED IN AN INPUT BUFFER AND ABOLISHING ENSUING RESIDUAL PRINT DATA

[75] Inventor: Yuji Okamoto, Nagoya, Japan

[73] Assignee: Brother Kogyo Kabushiki Kaisha, Japan

[21] Appl. No.: 219,383

[22] Filed: Jul. 15, 1988

[30] Foreign Application Priority Data

Jul. 16, 1987 [JP] Japan ................. 62-177872

[51] Int. Cl.⁵ .............................. G06F 15/00
[52] U.S. Cl. ........................ 364/519; 358/296
[58] Field of Search ... 364/200 MS File, 900 MS File, 364/519; 400/50, 51, 52, 54; 358/296, 300

[56] References Cited

U.S. PATENT DOCUMENTS 4,600,319 7/1986 Everett, Jr. .............. 400/52 X
4,673,990 6/1987 Okada .......................... 358/296

FOREIGN PATENT DOCUMENTS 61-17018 3/1980 Japan .

Primary Examiner—Gary V. Harkcom
Assistant Examiner—Michael A. Jaffe
Attorney, Agent, or Firm—Oliff & Berridge

[57] ABSTRACT

A printing apparatus of the type in which printing is carried out in accordance with data transmitted from a host computer. The data transmitted from the host computer is temporarily stored in a input buffer provided in the printing apparatus and the printing is carried out while fetching the data stored therein. When a clear switch is depressed to halt the printing operation, the printing operation is halted and the residual ensuing data remained in the host computer is not fed into the input buffer for storage but led to a data receiving means, whereby the residual ensuing data of the last block of data and another block of forthcoming data are not mixing with each other in the line buffer and thus the subsequent printing for another block can be started from the beginning.

5 Claims, 4 Drawing Sheets

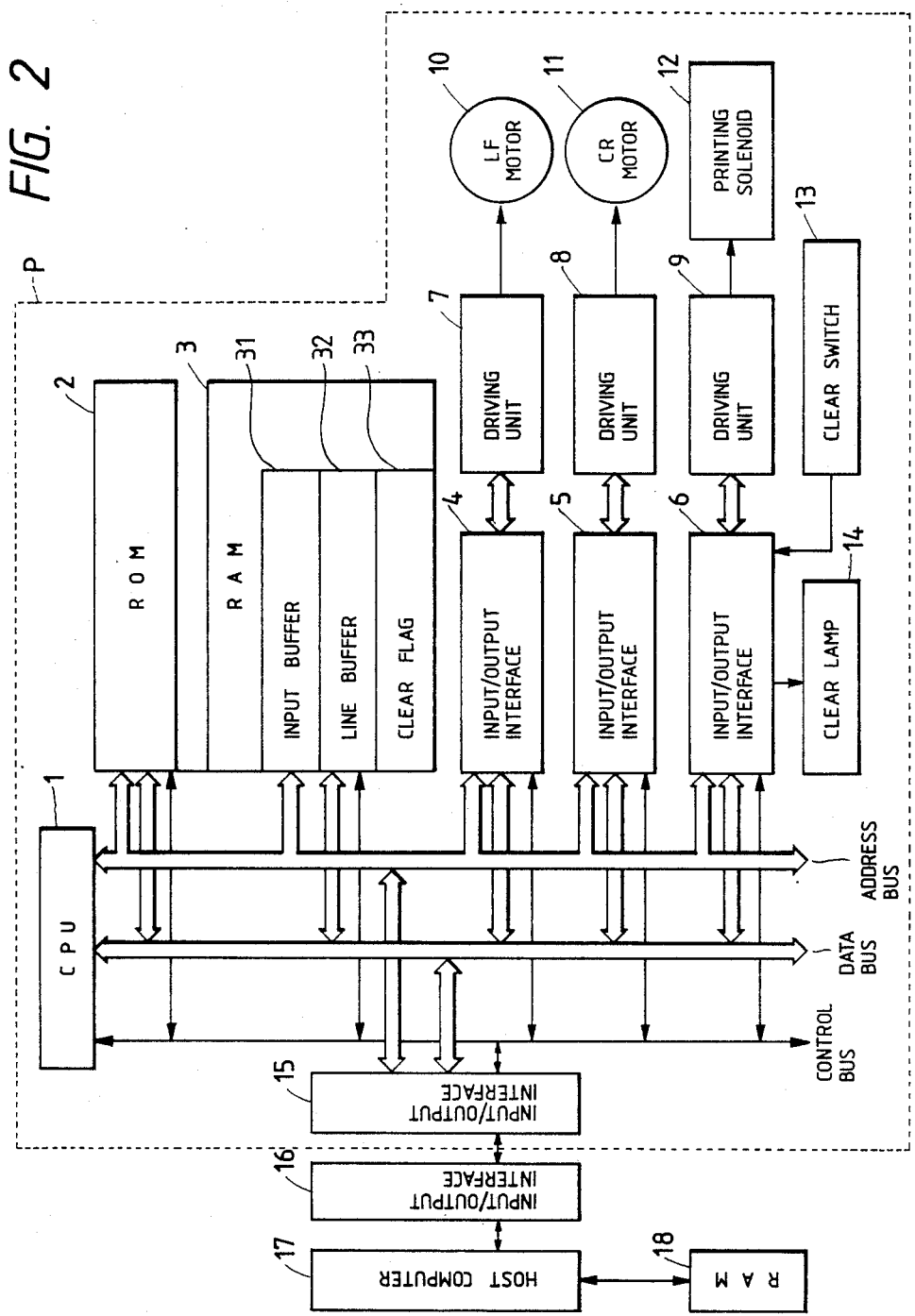

PRINTING APPARATUS HAVING MEANS FOR CLEARING UNWANTED PRINT DATA STORED IN AN INPUT BUFFER AND ABOLISHING ENSUING RESIDUAL PRINT DATA

BACKGROUND OF THE INVENTION

The present invention relates to a printer of the type in which printing is carried out in accordance with data fed from a host computer. More particularly, the invention relates to such a printer in which operation for halting the printing can easily be performed.

A conventional printer is provided with an input buffer of a relatively large capacity into which printing data fed from the host computer is temporarily stored. This makes it possible for the host computer to consecutively transmit a predetermined amount of data regardless of the printing operation. In addition, transmission latency can be reduced. With respect to the printer provided with the input buffer of a large capacity, the host computer is capable of executing another job after the input buffer has become full with the data being transmitted from the host computer. The host computer does need to wait until the printing operation is terminated. The host computer may again consecutively transmit another predetermined amount of data to the printer after the input buffer is exhausted. In this fashion, the operational efficiency of the host computer is enhanced with the use of the large capacity input buffer.

However, while it is advantageous in that the operational efficiency on part of the host computer is enhanced, an inconvenience is caused in the case where the printing operation is to be halted due to unsatisfactory printing format or an error or confusion of the documents to be printed. In such a case, an operator has to carry out two operations, one for halting the transmission of data from the host computer and another for clearing the input buffer of the printer. Moreover, it is necessary that the operation for halting the data transmission precede the operation for clearing the input buffer. If only the data transmission from the host computer is halted and the input buffer is not cleared, the data remained in the input buffer is subjected to printing in the subsequent printing. On the other hand, in the case where only the input buffer is cleared and the data transmission from the host computer is not halted, the residual data which remained untransmitted is transmitted from the host computer to the printer when the printing operation is restarted after the input buffer is cleared. Such residual data is transmitted until the input buffer is filled with the data and is subject to printing in the subsequent printing operation.

The input buffer is normally cleared by once switching off a power source and again switching on the power source. When this has done, the printing format is set to an intial condition, so that it is necessary for the host computer to once again set the printing format.

SUMMARY OF THE INVENTION

The present invention has been made in order to resolve the foregoing drawbacks accompanying the conventional printers, and accordingly it is an object of the invention to provide a printing apparatus which is capable of halting the printing operation with a simple procedure.

It is further object of the invention to provide a printing apparatus which is capable of starting another printing operation after the printing operation is halted without introducing any trouble.

In order to achieve the above and other objects, the present invention provides a printing apparatus as arranged in FIG. 1, in which included are a first data receiving means 200 which receives data from a host computer 100, and an instruction means 300 which issues an instruction to halt the printing. The printing is carried out by a printing means 400 in accordance with the data stored in the first data received means 200. The printing means 400 halts the printing in response to the instruction issued from the instruction means 300. The apparatus further includes a clearing means 500 which clears the data stored in the first data receiving means 200, and a second data receiving means 600 which receives the data transmitted from the host computer 100, wherein the second data receiving means 600 is activated when the instruction is issued from the instruction means 300 and the first data receiving means 200 is deactivated when the second data receiving means 600 is activated. A notification means 700 generates a notification signal when the instruction is issued from the instruction means 300 to notify the host computer 100 of permission of subsequent data transmission, whereupon the host computer 100 restarts transmission of the subsequent data.

In the printing apparatus arranged as described above, when the instruction is issued from the instruction means 300, the printing operation is halted and the data stored in the first data receiving means 200 is erased. At the same time, the data transmitted from the host computer 100 is led to the second data receiving means 600 whereat the data is not received in the first data receiving means. Since the apparatus operates in such a manner, the data stored in the first data receiving means is cleared by merely operating the instruction means, and further the ensuing data from the host computer 100 is not entered into the first data receiving means 200 but entered entirely into the second data receiving means 600. Therefore, the printing operation can easily be halted and the subsequent printing for another data can be restarted effectively.

BRIEF DESCRIPTION OF THE DRAWINGS

In the drawings:

FIG. 2 is a block diagram showing an arrangement of a printing apparatus according to one embodiment of the present invention;

DETAILED DESCRIPTION OF THE PREFERRED EMBODIMENT

Figure 1:
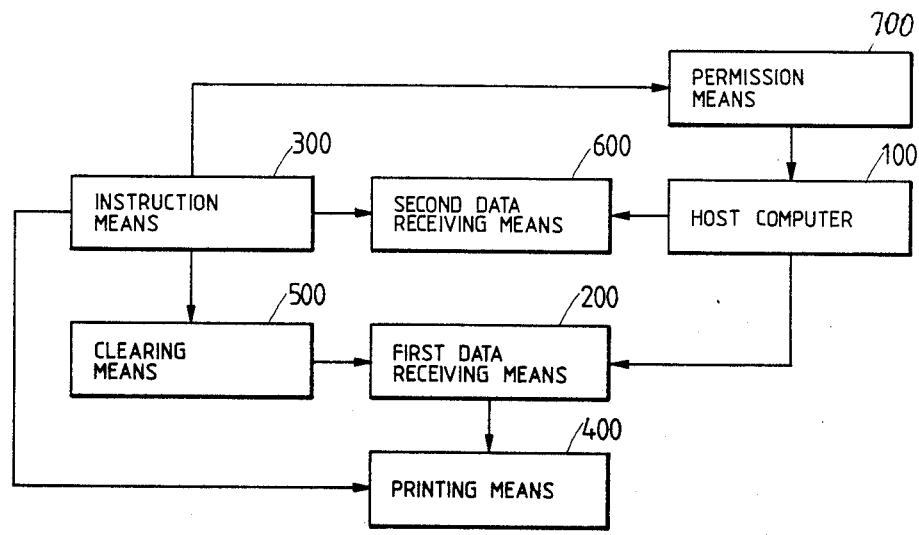
FIG. 1 is a block diagram for description of an inventive concept of the present invention.

A preferred embodiment of the present invention will now be described with reference to the accompanying drawings.

In FIG. 2, reference numeral 1 designates a central processing unit (CPU) constituting a control unit of a printer P. To the CPU 1, each of ROM 2, RAM 3, and input/output interfaces 4, 5 and 6 is connected through an address bus, a data bus, and a control bus. Print control programs including various kinds of function processing routines, font patterns, etc. are stored in ROM 2. In RAM 3, there are provided an input buffer 31 for temporarily storing an input data, a line buffer 32 for composing character patterns for one line, and a clear flag 33 for indicating a clear mode of the input buffer 31. The clear flag 33 is set when a clear instruction for clearing the input buffer 31 is given. The input buffer 31 is of a FIFO (First In First Output) arrangement.

Driving units 7, 8 and 9 are connected to the input-/output interfaces 4, 5 and 6, respectively. To the driving units 7, 8 and 9, and LF motor 10 for paper feeding, a CR motor 11 for moving a carriage having mounting thereon a printing head, and printing solenoids 12 for driving impact wires are connected, respectively. A clear switch 13 and a clear lamp 14 are further connected to the input/output interface 6. The clear switch 13 constitutes an instruction means for instructing to clear or erase the data loaded in the input buffer 31. The clear lamp 14 indicates the clear mode of the input buffer 31. The input/output interface 15 of the printer P is connected to the input/output interface 16 of the host computer 17. Print data stored in a RAM 18 provided in association with the host computer 17 is transmitted to the printer P under the aegis of the host computer 17 and is loaded into the input buffer 31. The data stored in the input buffer 31 is fetched to carry out printing in accordance with the instructions executed by CPU 1 of the printer P.

Next, the processing sequences executed by CPU 1 of the printer P will be described with reference to a timing chart shown in FIG. 3 and flowcharts shown in FIGS. 4 and 5.

Figure 5:
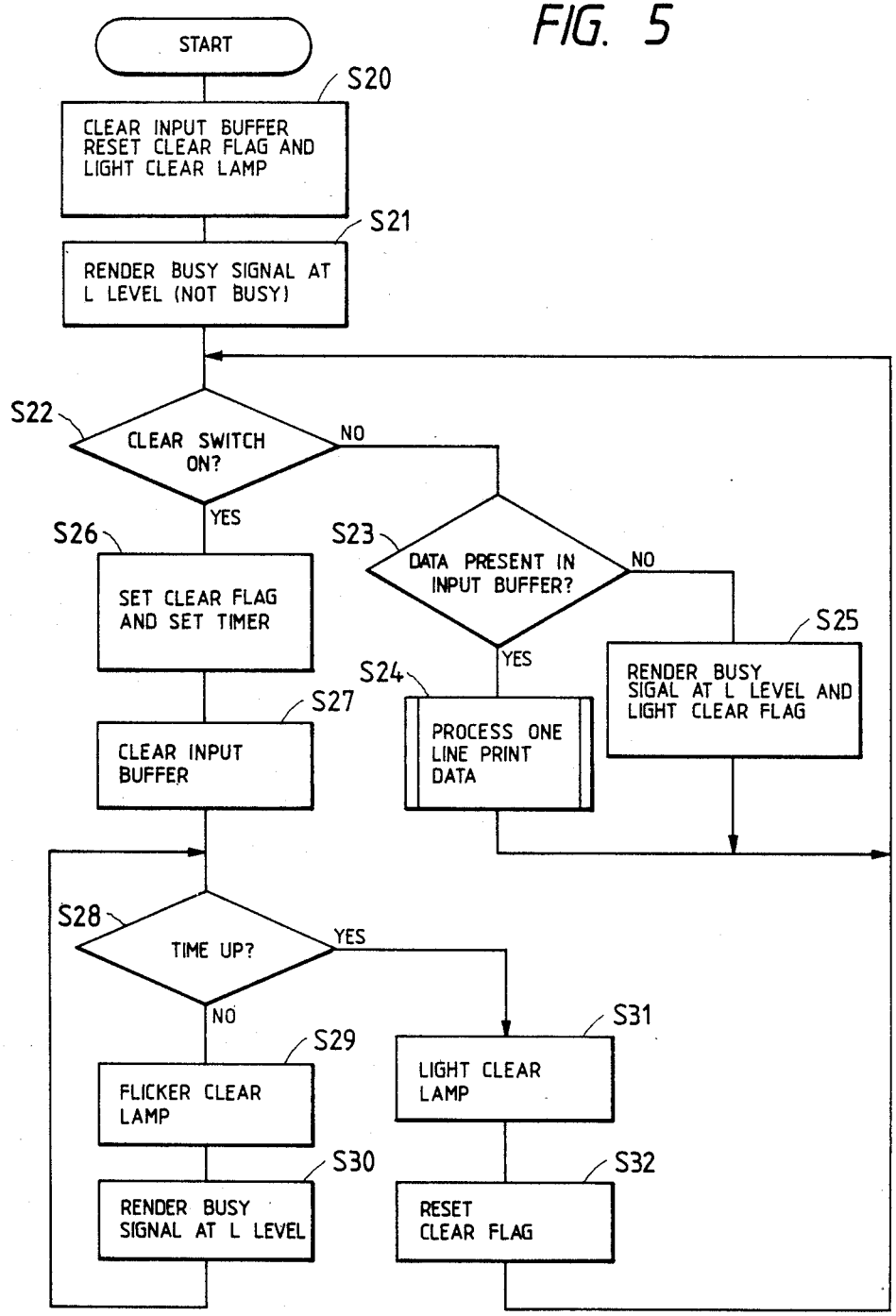

A main program shown in FIG. 5 is run when the printer P has been powered or reset. In step 20, the input buffer 31 is cleared concurrent with initial settings of other segments. At this time, the clear flag 33 is down or reset and the clear lamp 14 is lit. In step 21, a BUSY signal (active high) is rendered at low (L) level. This occurs at time instant t1 shown in the timing chart of FIG. 3. Thus, the printer P is in no-busy state capable of receiving data from the host computer 17. In step 22, judgement is made as to whether or not the clear switch 13 is ON. Since the clear switch 13 is OFF in the first execution cycle, the processing advances to step 23 where it is judged whether or not data is present in the input buffer 31. The result of the judgement is "no", because no data is present in the first execution cycle. Therefore, the processing in step 25 is next executed where the BUSY signal is again rendered at L level, although in the first execution cycle, the BUSY singal has already been rendered at L level in step 21. Thereafter, the sequence returns to step 22. If, at this time, the clear lamp 14 has not been lit, the clear lamp 14 is rendered lit. During the period from the power ON of the printer P until the printer P begins receiving the data from the host computer 17, the processings in steps 22, 23 and 25 are repeatedly carried out.

When the printing program is executed in the host computer 17, the level of the BUSY signal is detected. Detection of L level of the BUSY signal indicates that the printer P is placed in a condition ready for receiving data. 8-bit parallel DATA signal is outputted from the host computer 17 at time instant t2, and a $\overline{\text{DATA STROBE}}$ signal (active low) which imparts to the printer P a reading timing of the DATA signal is outputted therefrom at time instant t3. When the $\overline{\text{DATA STROBE}}$ signal is applied to the input/output interface 15, the same serves as an interruption signal with respect to CPU 1, whereupon an interrupt program shown in FIG. 4 is executed.

Figure 3:
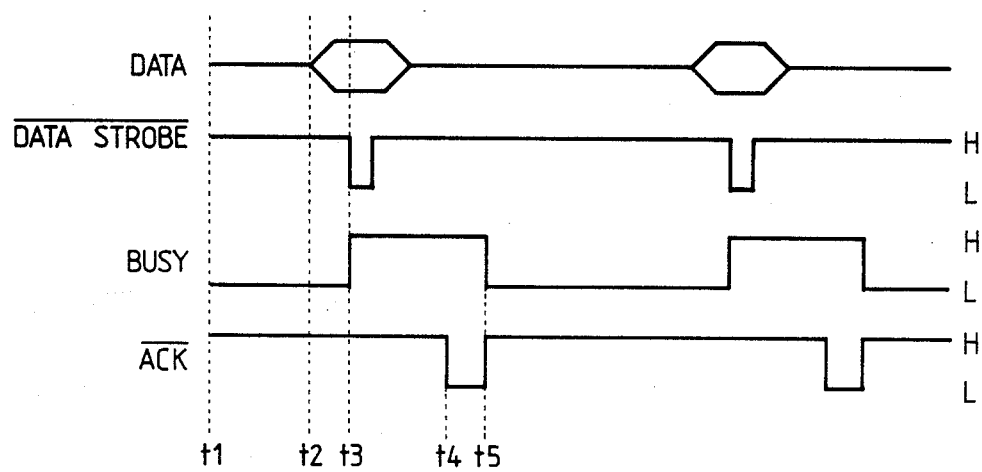
FIG. 3 is a timing chart showing various control signals used for controlling the printing apparatus.
Figure 4:
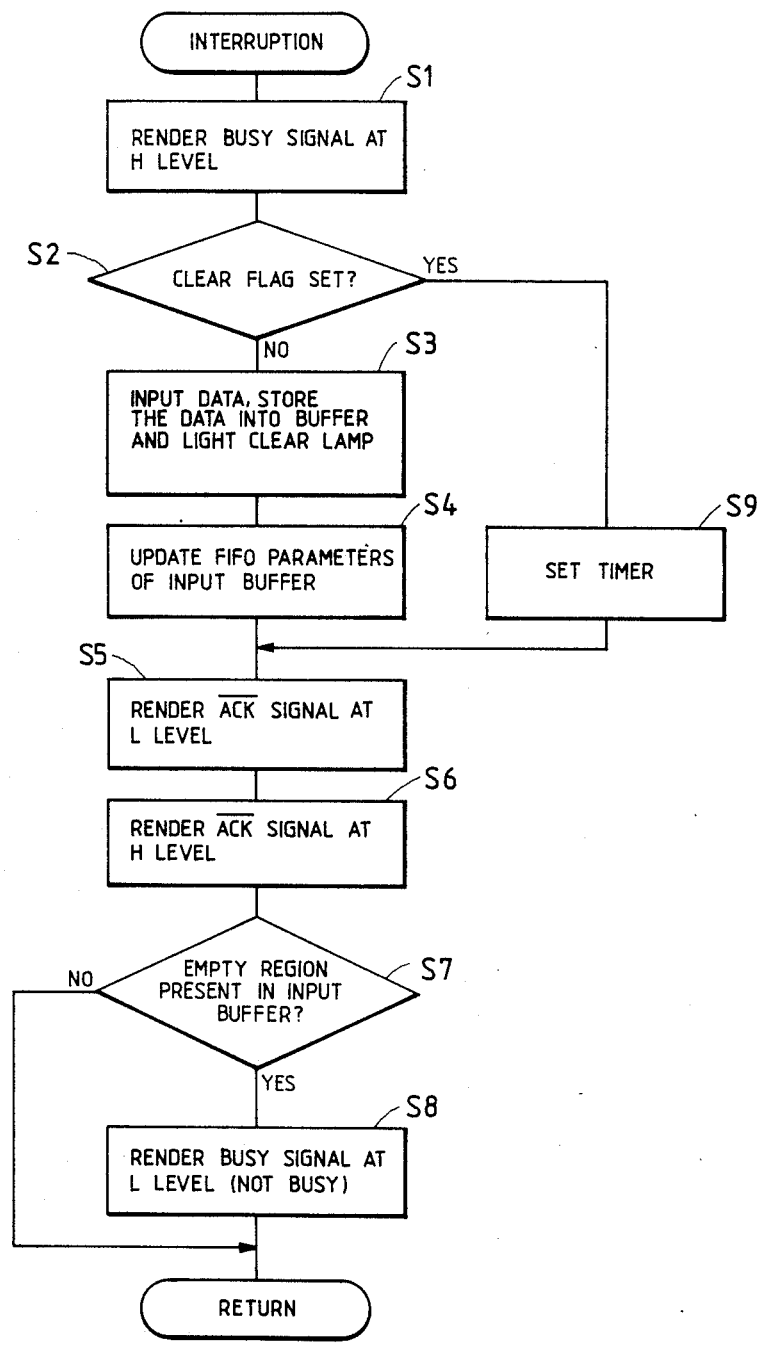
FIGS. 4 and 5 are flowcharts showing processing sequences of a CPU incorporated in the printing apparatus.

Referring to FIGS. 3 and 4, at time instant t3 at which the processing in step 1 is executed, the BUSY signal is raised to a high (H) level so as to prohibit the subsequent data from being transmitted to the printer P from the host computer 17. In the next step 2, judgement is made as to whether or not the clear flag 33 is up or set. Since the clear flag 33 is down at the first execution cycle, the result of the judgement is "no" and then processing advances to step 3. In step 3, data for one character being applied to the input-output interface 15 is read thereinto and loaded into the input buffer 31. In order to indicate that the data is present in the input buffer 31, the clear lamp 14 is extinguished. In the next step 4, FIFO parameters, including a leading data storage address, the trailing data storage address, and data length in the input buffer are updated.

Next, in order to inform the host computer of the acknowledgement of the data reception, an $\overline{\text{ACK}}$ signal is rendered at L level at time instant t4 at which time step 5 is executed, and then the $\overline{\text{ACK}}$ signal is rendered at H level at time instant t5 at which step 6 is executed. Consequently, the negative and active low ACK signal is outputted to the host computer 17 via the input/output interface 15. Next, in step 7, it is judged whether or not an empty region exists in the input buffer 31. When affirmative (yes), in order to inform the host computer 17 of the permission of transmission of the subsequent data, the BUSY signal is rendered at L level at time instant t5 at which step 8 is executed, whereupon the processing of the interrupt program is terminated. If the transmission data still remains in the host computer 17, the subsequent 8-bit parallel DATA signal is transmitted to the printer P together with the $\overline{\text{DATA STROBE}}$ signal. The interrupt program in FIG. 4 is again executed in accordance with the $\overline{\text{DATA STROBE}}$ signal, and the processings of the data reception are carried out. In this manner, by the repetition of steps 1 through 8, the reception data is stored in the input buffer 31. When the results of the judgment in step 7 indicates that no empty region exists in the input buffer 31, the interrupt program is immediately terminated. That is, since the BUSY signal remains at H level, the data transmission from the host computer 17 is prohibited.

Referring back to FIG. 5, during processings of the routine defined by steps 22, 23 and 25, when the reception data is loaded into the input buffer 31 in accordance with the interrupt program in FIG. 4, the result of the judgement in step 23 becomes "yes", whereupon in step 24, the print data for one line is formed in the line buffer 32 and then the printing is carried out. After that, returning to step 22, steps 22, 23 and 24 are repeatedly executed insofar as the data is present in the input buffer 31. Consequently, the data which has been stored in the input buffer 31 is consecutively printed. As the printing operation proceeds, the input buffer 31 will be exhausted. Then, the result of the judgement in step 23 turns to "no", and the BUSY signal is rendered at L level in step 25. At the same time, in order to indicate that the input buffer 31 has been exhausted, the clear lamp 14 is lit, whereby the printer P is put in a state capable of receiving the data from the host computer 17. If the host computer 17 retains further transmission data, the interrupt program in FIG. 4 is consecutively executed in accordance with interruptions by the DATA STROBE signal. A series of data is thus loaded into the input buffer 31 until it has become full.

During printing operation, when an operator wants to halt the printing, he may depress the clear switch 13. By the depression of the clear switch 13, the result of the judgement in step 22 becomes "yes", and the processing in step 26 is executed where the clear flat 33 is set to indicate that the clear operation is being carried out, and a subtraction timer is set to a predetermined time, say 1 second. In the subsequent step 27, the input buffer 31 is cleared. In step 28, judgement is made as to whether or not the timer time is up. Since the timer has just set in the first execution cycle, the result of the judgement in step 28 is "no". In step 29, the clear lamp 14 is flickered to thereby indicate the operator that the input buffer 31 is during the clear operation. In step 30, the BUSY singal is rendered at L level, whereby the printer P is put in the state capable of receiving the data from the host computer 17. Thereafter, upon returning to step 28, steps 29 and 30 are repeatedly executed until it is judged that the timer time is up.

During the processings described above, since the BUSY signal ramains at the L level, the DATA signal is transmitted from the host computer 17 together with the $\overline{\text{DATA STROBE}}$ signal insofar as the transmission data remain in the host computer 17. Therefore, the interrupt program in FIG. 4 is executed in synchronization with the $\overline{\text{DATA STROBE}}$ signal. Since the clear flag 33 has been set, the result of the judgement in step 2 (in FIG. 4) is "yes". Step 9 is subsequently executed where the substraction timer is reset before expiration of the time set in step 26 (in FIG. 5). Steps 5 through 8 are then executed, in which the $\overline{\text{ACK}}$ signal is outputted and the BUSY signal is rendered at L level. The printer P is again placed in the state capable of receiving the data, so that the DATA signal and the $\overline{\text{DATA STROBE}}$ signal are transmitted from the host computer 17 until no transmission data is present in the host computer 17. The interrupt program in FIG. 4 is substantially consecutively executed in synchronization with the $\overline{\text{DATA STROBE}}$ signal, and thus the above-described processings are repeatedly carried out, whereat steps 3 and 4 are not executed, so that the reception data is not loaded into the input buffer 31. The timer is again set before expiration of the time set in step 9.

In synchronization with the $\overline{\text{DATA STROBE}}$ signal, the data is sequentially received and abandoned. When there exists no transmission data in the host computer 17, the DATA signal and the $\overline{\text{DATA STROBE}}$ signal are noit outputted even though the BUSY signal is at the L level. Accordingly, after the timer is reset in step 9 at which the processing of the final reception data is executed, no further data is transmitted from the host computer 17 even after the expiration of the predetermined period of time. Accordingly, resetting of the timer is not performed in step 9. For this reason, since CPU 1 is executing the loop defined by steps 28, 29 and 30 when the interrupt program in FIG. 4 is not executed, the timer is judged to be out of time up in step 28 when the predetermined period of time being set has expired. In step 31, the clear lamp 14 is lit so as to indicate to the operator of the end of the clear processing. In step 32, the clear flag 33 is reset. Specifically, in the case when no further data is received after expiration of the predetermined period of time from the time when the last data is received, the data transmission from the host computer 17 is judged to be totally completed.

As described above, when the printing operation is to be halted during the printing operation, it can be effectively performed by simply depressing the clear switch 13.

Although the present invention has been described with reference to a specific embodiment, it can be appreciated that a variety of changes and modifications may be made without departing from the scope and spirit of the invention. For example, the printing condition may be set so that the carriage is positioned in an origin and the printing position is set to the head portion of a new page when the input buffer 31 is cleared.

According to the present invention, the input buffer is erased merely by operating the clear switch of the printing apparatus, and the data received from the host computer subsequent to the operation of the clear switch is abandoned. Therefore, the halt of the printing operation can be accomplished with simple procedure and in efficient fashion. Besides, the printing of a new document can be started without introducing troubles.

What is claimed is:

1. A printing appartus of the type in which printing is carried out in accordance with data transmitted from a host computer wherein said host computer transmits a predetermined amount of data to said printing apparatus, comprising:
    a first data receiving and storing means for receiving the data transmitted from a host computer and storing the same;
    a printing means for carrying out printing in accordance with the data stored in said first data receiving and storing means;
    an instruction means for issuing an instruction to halt the printing being carried out be said printing means, said printing means halting the printing in response to said instruction;
    a clearing means responsive to said instruction for clearing said data stored in said first data receiving and storing means;
    a second data receiving means for receiving the data transmitted from a host computer, said second data receiving means being activated only when said instruction is issued, wherein said first data receiving and storing means is deactivated when said second data receiving means is activated; and
    a permission means for permitting a host computer to transmit a residual ensuing data of said predetermined amount of data to the second data receiving means, said permission means generating a permission signal when said instruction is issued, and wherein a host computer starts transmission of the residual ensuing data when said permission signal is received.

2. A printing apparatus according to claim 1, further comprising a detection means for detecting a trailing end of said predetermined amount of data being transmitted from a host computer, said detection means outputting a detection signal when said trailing end thereof is detected.

3. A printing apparatus according to claim 2, wherein said detection means comprises a timer means, said timer means setting a predetermined period of time, said timer means outputting said detection signal when the data from a host computer is not received for more than said predetermined period of time.

4. A printing apparatus according to claim 2, further comprising a first indication means responsive to said instruction for indicating the issuance of said instruction, said first indication means generating a first indication signal indicative of the issuance of said instruction.

5. A printing apparatus according to claim 4, further comprising a second indication means responsvie to said detection signal for indicating the end of data transmission of said predetermined amount of data, said second indication means generating a second indication signal indicative of the end of data transmission.

* * * * *